April 25, 1950     A. H. NELLEN     2,505,137
VEHICLE TIRE

Filed Feb. 23, 1949     2 Sheets-Sheet 1

INVENTOR.
ARTHUR H. NELLEN
BY

April 25, 1950     A. H. NELLEN     2,505,137
VEHICLE TIRE

Filed Feb. 23, 1949                     2 Sheets-Sheet 2

INVENTOR.
ARTHUR H. NELLEN
BY

Patented Apr. 25, 1950

2,505,137

UNITED STATES PATENT OFFICE 2,505,137

VEHICLE TIRE

Arthur H. Nellen, Merion Park, Pa., assignor to Lee Rubber & Tire Corporation, Conshohocken, Pa., a corporation of Pennsylvania Application February 23, 1949, Serial No. 77,797

6 Claims. (Cl. 152—209)

This invention relates generally to automobile tire casings and more particularly to improvements in the design and construction of the tread thereof.

Among the principal objects of the present invention is to provide a tread for a pneumatic tire casing for effectively increasing the traction of the tire in both snow and mud and so largely avoiding the necessity of equipping the tires with chains or other traction devices.

While it is now more or less conventional in the art to employ pneumatic tire casings into which are built various types and designs of so-called traction lugs, they have not been generally satisfactory when employed in snow and mud for which they are especially designed due primarily to the fact that the snow or mud tends to pack into the spaces between the traction lugs and forms with the latter a relatively smooth tread surface for the tire having little, if any, tractive efficiency.

In the tire casing as constructed in accordance with the present invention, the normal tread thereof is provided with traction calks of such special design and so arranged in circumferentially spaced relation about the tire tread that they operate, during each revolution of the wheel, to expel the snow or mud from the calks and so maintain the tread free and clear of any clogged mud or snow such as would reduce the tractive efficiency of the tire.

In addition to the foregoing, it is an object of the present invention to provide a pneumatic tire casing wherein the aforesaid self-cleaning traction calks are so formed as integral elements of circumferentially continuous riding ribs that when said traction calks are worn down the riding ribs remain as elements of a conventional tire of rib type.

Still other important objects of the present invention are to provide a tire especially adapted for driving through snow or mud wherein the self-cleaning calks aforesaid are well adapted to withstand wear, are effective to resist circumferential as well as lateral slip and are relatively quiet in operation even when the tires are driven over a smooth road surface free of snow or mud.

Other objects and advantages of the present invention will be apparent hereinafter. It will be apparent, of course, that the traction calk configuration may be varied in shape and size without departing from the essential principles of the present invention, and accordingly, it is to be understood that the present invention consists substantially in the construction and relative arrangement of the traction calks as described more particularly hereinafter, as exemplified in the accompanying illustrations and as finally pointed out in the appended claims.

Figure 4:
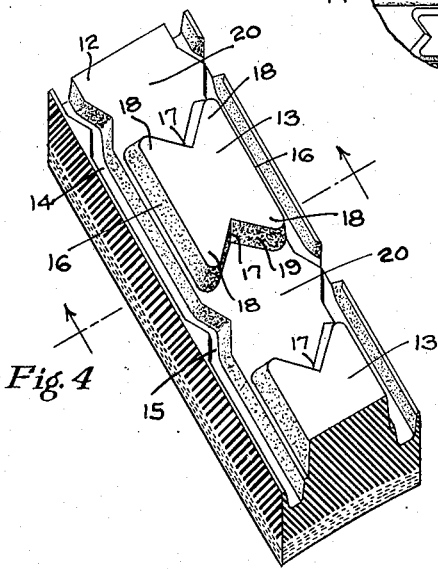
Figure 4 is a perspective view of a longitudinal section of the tire showing one of the riding ribs thereof and several of the traction calks associated therewith.
Figure 5:
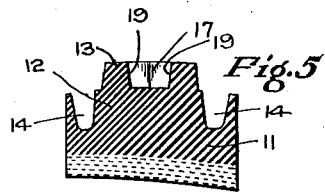
Figure 5 is a transverse sectional view as taken on the line 5—5 of Figure 4.

Referring now more particularly to the drawings, it will be observed that the tire 10 is of conventional construction except for the tread portion 11 thereof, the latter being the outer part of tire which is formed of compounded rubber and which acquires its particular shape and configuration by subjecting it to heat and pressure in a suitable mold. This tire tread 11 which is thus formed in accordance with conventional tire manufacturing procedure is characterized by the provision of a plurality of laterally spaced, circumferentially continuous riding ribs 12 each having formed upon its outer surface a plurality of circumferentially spaced traction calks 13, preferably of the particular construction best shown in Figures 4 and 6. These riding ribs 12 are laterally separated from each other by relatively narrow circumferential grooves 14 which may be provided at spaced points with laterally offset jogs 15, all in accordance with well-known practice in the pneumatic tire art.

It will be noted that in accordance with the present invention the traction calks 13 are formed as integral elements of the several riding ribs 12, these calks being projected outwardly of the flat surface of each rib to a substantial depth, this depth preferably being approximately equal to the depth of the supporting rib. In actual practice it has been found that calks measuring ¼ inch in depth provide very satisfactory traction in snow or mud for tires of passenger car size, while for larger tires, such as for commercial vehicles, a greater depth of calk has been found to be most efficient. The calks 13 are generally elongate in form with their opposite side edges 16—16 preferably spaced slightly inwardly of and paralleling the corresponding side edges of the particular riding rib upon which they are founded, the opposite ends of each calk being indented or notched, as at 17, to provide at each end of the calk a pair of wing portions 18—18 of substantially triangular form. The inner edges 19—19 of these wing portions 18—18 are angularly related to form therebetween a generally V-shaped space the mouth of which presents outwardly of the end of the calk, in consequence of which each adjoining pair of calks of a particular riding rib define therebetween a recess 20 on said rib having relatively pointed opposite ends 21—21. Preferably, the angularly related edges 19—19 which form each pointed end of the recess 20 are oppositely inclined or chamfered with respect to the flat calk-supporting surface of the riding rib, and, if desired, the opposite longitudinally extending edges 16—16 of each calk may also be oppositely chamfered or beveled.

Figure 2:
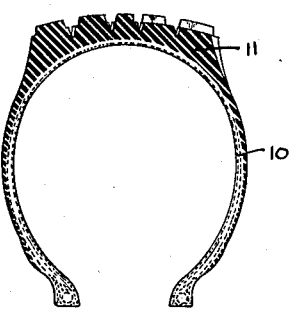
Figure 2 is a transverse cross-sectional view of the tire.
Figure 1:
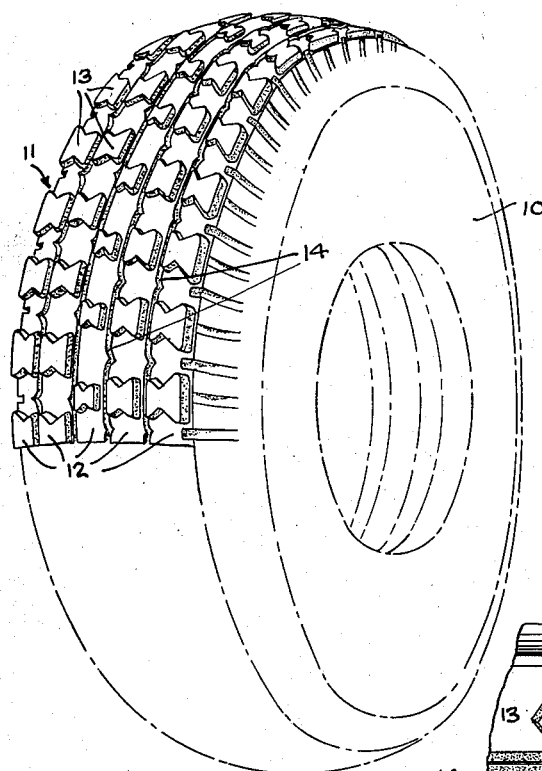
Figure 1 is a perspective view of a tire, shown partially in phantom, having incorporated therein a traction tread constructed in accordance with and embodying the principles of the present invention.

Obviously, the number and relative spacing of the calks on each of the riding ribs 12, as well as the number and spacing of the riding ribs themselves, may be varied as desired to provide maximum traction efficiency for the tire. In the construction of tire as shown in the accompanying drawings, the tread portion 11 includes five riding ribs the center one of which is of somewhat reduced width as compared with the widths of the two outer pairs of the ribs. Consequently, the traction calks formed on the central rib are somewhat smaller in width than those of the outer ribs. While each rib 12 preferably includes the same number of traction calks spaced uniformly apart, the calks of one or more ribs may be circumferentially offset relatively to those of the other ribs. Thus, as most clearly appears in Figures 1 and 6, the calks of one outer pair of the riding ribs are staggered with respect to those of the central rib and the opposite outer pair thereof. Of course, any arrangement and spacing of the calks in relation to one another both laterally and circumferentially other than as specifically shown may be employed.

Figure 3:
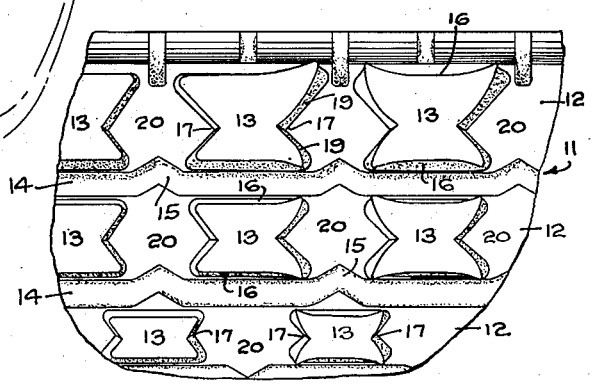
Figure 3 is an elevational view of a portion of the tread surface of the tire as it appears when in engagement with the road surface.
Figure 6:
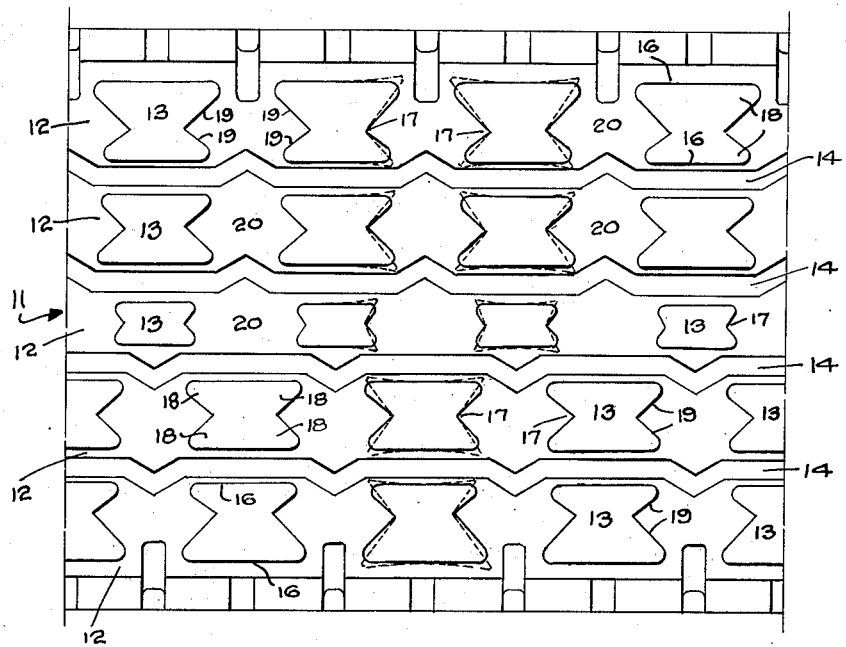
Figure 6 is a plan view of the tread of the tire shown in Figure 1, the tread being shown flattened rather than curved as in actual construction.

The notched ends of the calks function primarily as gripping elements in snow or mud to effectively prevent slipping or skidding of the tire and function further when the tire is in use to prevent its surface from being clogged with snow or mud, this anticlogging or self-cleaning action being best illustrated in Figures 3 and 6. As shown in these figures, as the traction calks successively engage the snow or mud-covered road surface, the outer surface portions of the wing portions 18—18 thereof, under the driving or braking torque on the tire tread at its point of engagement with the road surface as well as under the pressure exerted by the weight of the vehicle, spread apart or expand (as shown in dotted lines in Figure 6 and somewhat exaggerated in Figure 3) to receive therebetween a "slug" of snow or mud, it being observed that one such slug will be packed in each recess 20 of the tire tread as such recess assumes a position immediately on the road surface. Thus, as each recess assumes the said position, the opposite ends of the snow or mud slug lodged therein is frictionally engaged by the spread-apart V-shaped ends of the pair of calks which define the recess.

Now, when the adjoining ends of such pair of traction calks move out of contact with the road surface and are thereby no longer subject to expansion by either driving or braking torque or by the weight of the vehicle, the inherent resiliency of the wing portions 18—18 cause them to contract to their normal unflexed condition with the result that the inclined or chamfered edges 19—19 thereof at each opposite end of a snow or mud slug operate on the latter in the nature of cams to expel the slug from the recess. Thus, during each revolution of the tire in snow or mud, the several recesses 20 are successively freed of snow or mud lodged therein practically instantly as the traction calks move out of contact with the road surface, in consequence of which the tread is at all times maintained free and clear of clogging accumulation of snow or mud and so is operative at maximum traction efficiency.

It will be understood, of course, that the present invention is susceptible of various changes and modifications which may be made from time to time without departing from the real spirit or principles thereof, and it is accordingly intended to claim the same broadly, as well as specifically, as indicated in the appended claims.

What is claimed as new and useful is:

1. A vehicle tire having an outer tread of compounded rubber, said tread being provided with a plurality of laterally spaced circumferentially continuous riding ribs each having integrally formed thereon a plurality of uniformly spaced traction calks of elongate form having notches formed in the opposite ends thereof, each of said calks being of maximum width along a transverse line disposed substantially midway between the notched ends thereof.

2. A vehicle tire having an outer tread of compounded rubber, said tread being provided with a plurality of laterally spaced circumferentially continuous riding ribs each having integrally formed thereon a plurality of circumferentially spaced traction calks of elongate form having substantially parallel side edges, each of said calks being characterized in that the opposite ends thereof are respectively indented for the full depth thereof to provide at each end of the calk a pair of laterally spaced wing portions capable of being relatively expanded and contracted during operation of the vehicle tire.

3. A vehicle tire having an outer tread of compounded rubber provided upon its peripheral surface with a plurality of laterally spaced circumferentially continuous riding ribs each having integrally formed thereon a plurality of circumferentially spaced traction calks, said calks being each characterized in that the opposite ends thereof are respectively indented for the full depth thereof to provide at each end of the calk a pair of laterally spaced portions capable of being relatively expanded and contracted during operation of the vehicle tire, each of said calks being generally of rectangular form with its maximum width along a transverse line disposed substantially midway between the opposite indented ends thereof.

4. In a vehicle tire of the character defined in claim 3 wherein the indentations in the opposite ends of each calk are of substantially V-shape whereby said laterally spaced portions are of substantially triangular form in plan and are disposed with their proximate hypotenusal edges outwardly diverging.

5. In a vehicle tire of the character defined in claim 3 wherein the indentations in the opposite ends of each calk are of substantially V-shape whereby said laterally spaced portions are of substantially triangular form in plan and have hypotenusal edges diverging endwise of the calk, and wherein said diverging edges of the laterally spaced portions are oppositely beveled in planes respectively inclined outwardly of the tread body and away from each other.

6. A vehicle tire having an outer tread of compounded rubber provided upon its peripheral road-engaging surface with a plurality of laterally spaced circumferentially continuous riding ribs each having integrally formed thereon a plurality of circumferentially spaced traction calks of generally rectangular shape having substantially parallel side edges, said calks being each characterized in that the opposite ends thereof are respectively notched to provide at each end of the calk a pair of laterally spaced portions capable of being relatively expanded and contracted during operation of the vehicle tire, the several calks being so uniformly spaced in each row thereof that adjoining pairs of said calks form traction recesses from which snow or mud lodged therein while said portions are relatively expanded is expelled upon contraction of said portions into their normal unflexed positions.

ARTHUR H. NELLEN.

REFERENCES CITED

The following references are of record in the file of this patent:

UNITED STATES PATENTS

| Number | Name | Date |
| --- | --- | --- |
| 1,384,759 | Hulse | July 19, 1921 |
| 1,956,011 | Evans | Apr. 24, 1934 |